May 14, 1957
W. O. SEIBOLD
2,792,190
SYSTEMS INCLUDING A STEERABLE VEHICLE
AND A FINDER DEVICE MOUNTED THEREON
Filed Feb. 28, 1952
3 Sheets-Sheet 1
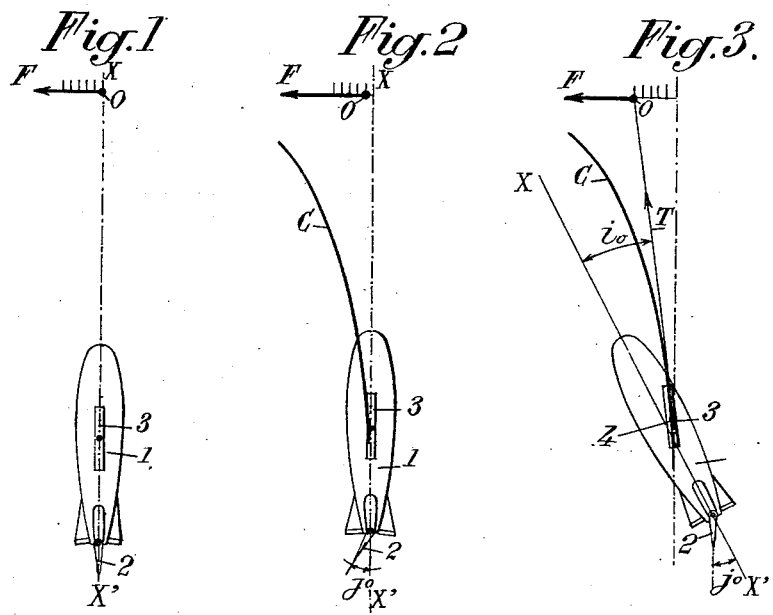
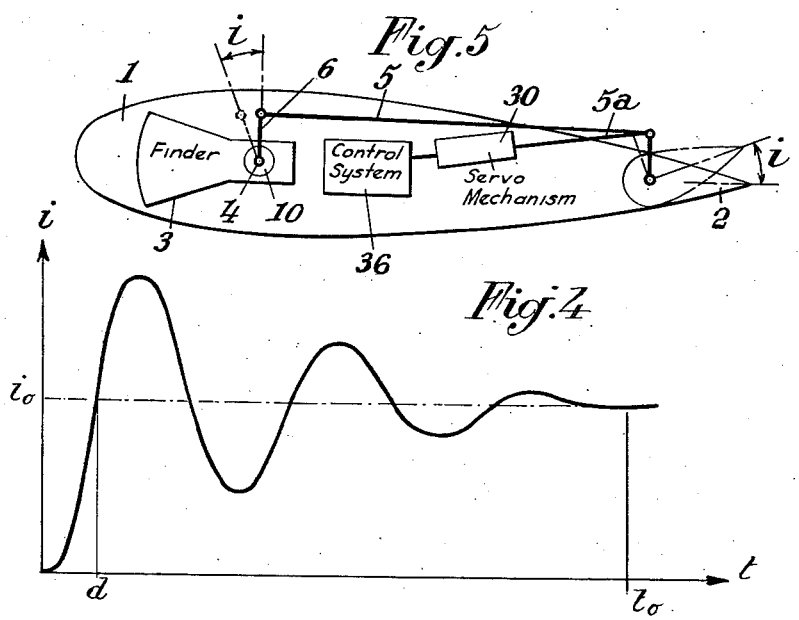
INVENTOR
WILHELM OTTO SEIBOLD
BY
ATTORNEY May 14, 1957 W. O. SEIBOLD 2,792,190
SYSTEMS INCLUDING A STEERABLE VEHICLE
AND A FINDER DEVICE MOUNTED THEREON
Filed Feb. 28, 1952 3 Sheets-Sheet 2
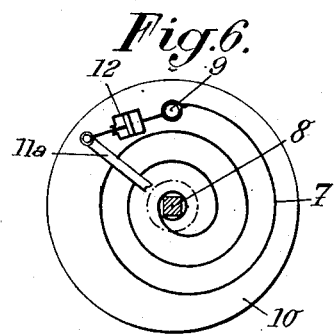
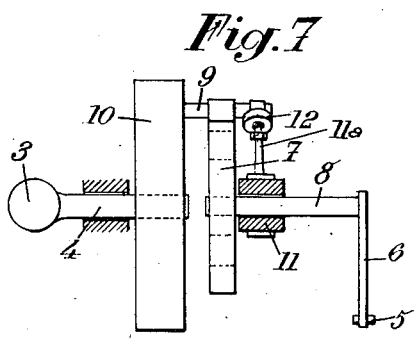
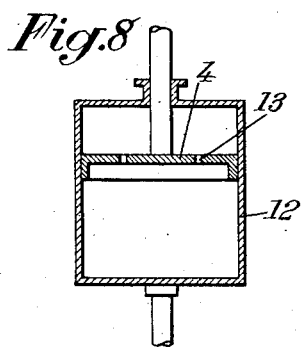
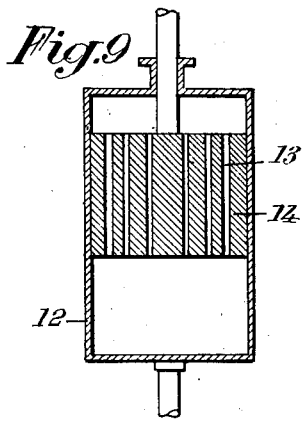
INVENTOR
WILHELM OTTO SEIBOLD
BY
ATTORNEY

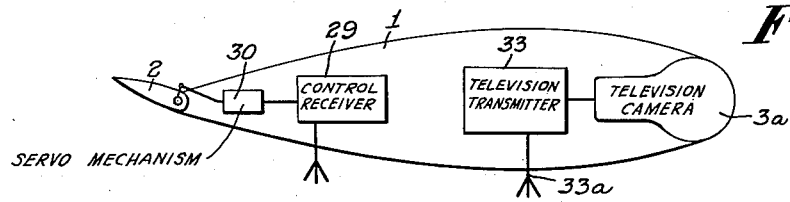
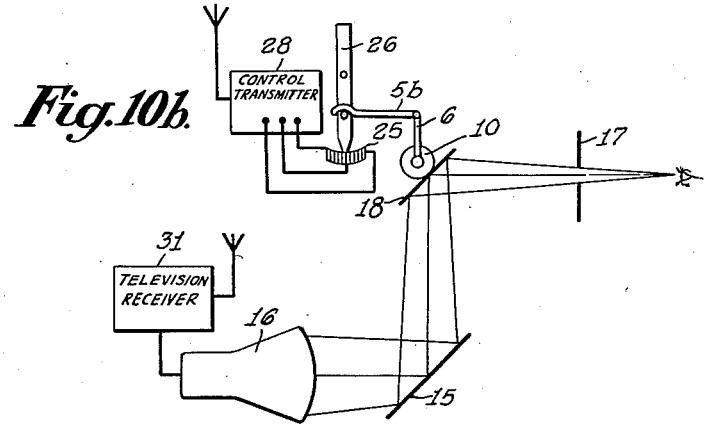
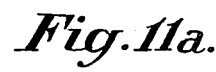
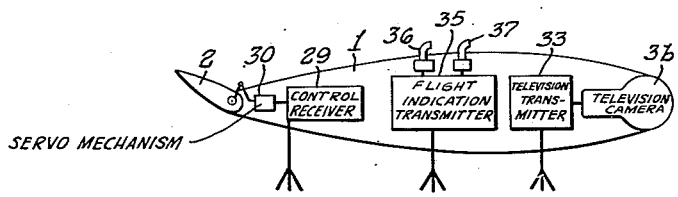
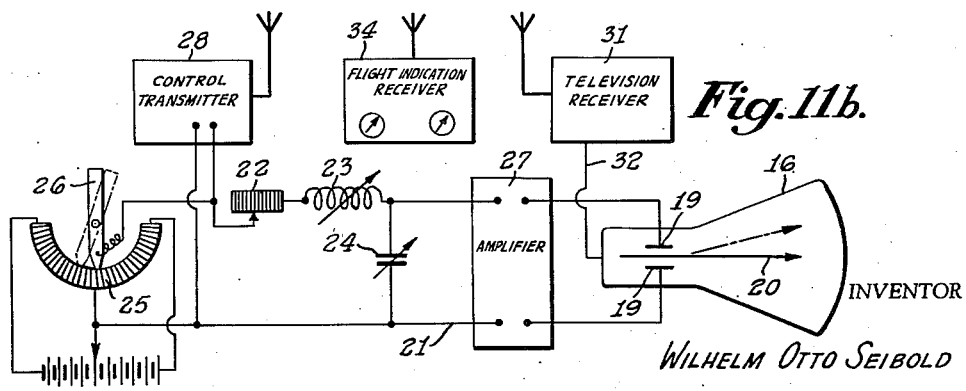

United States Patent Office 2,792,190
Patented May 14, 1957

2,792,190

SYSTEMS INCLUDING A STEERABLE VEHICLE AND A FINDER DEVICE MOUNTED THEREON

Wilhelm Otto Seibold, Brunoy (Seine-et-Oise), France, assignor to Helmut Ph. G. A. R. von Zborowski, Brunoy (Seine-et-Oise), France Application February 28, 1952, Serial No. 273,901

Claims priority, application France February 28, 1951

6 Claims. (Cl. 244—14)

The present invention relates to systems including a steerable vehicle and a finder device mounted on said vehicle for giving an electric, acoustic, optical or other image of a given field of space including a target on which the axis of said finder is for instance to be trained, such a system possibly including, (for instance in the case of the vehicle being a guided missile) an image receiver located at a distance from said vehicle.

Every steering action exerted upon such a vehicle has for its effect to modify its position with respect to the direction of its movement (i. e. to the tangent of its trajectory), thus producing, if the finder device is mounted in fixed position on said vehicle, displacements of the image supplied by said device which do not correspond to the modification of its trajectory due to said steering action and which may even bring the target outside of the field of observation of the finder device. Now it is desired to obtain from this finder device an accurate indication of any actual variation of the trajectory with respect to the target.

The object of my invention is to provide a system of this kind which obviates this drawback and in particular which eliminates or at least reduces to an admissible minimum the influence on the indication of the finder device of the modification of position of the vehicle with respect to its direction of movement (i. e. of the variation of its angle of incidence on its trajectory) caused by a steering action exerted thereon.

Preferred embodiments of my invention will be hereinafter described with reference to the accompanying drawings, given merely by way of example, and in which:

Figs. 1 to 3 inclusive are diagrammatic views serving to explain the problem with which my invention is concerned, but which do not illustrate how this problem is solved according to my invention;

Fig. 4 is a curve showing the response to an aircraft to an action of its steering means;

Fig. 5 diagrammatically shows a device for operatively connecting with the steering means of an aircraft finder device, such as a television camera, movaly mounted on said aircraft;

Figs. 6 and 7 are respectively a side view and a front view of an oscillatory mechanism to be included in said interconnecting means;

Figs. 8 and 9 are diagrammatical views of two embodiments of a damping device to be included in said interconnecting means;

Figs. 10a and 10b diagrammatically show an application of my invention to a system including a television receiver (Fig. 10b) located at a distance from a vehicle (Fig. 10a) fitted with a television transmitter cooperating with this receiver;

Figs. 11a and 11b are views similar to Figs. 10a and 10b respectively and relating to a modification.

I will first explain the object of my invention in the case of a vehicle, consisting for instance of a guided missile, provided with a television transmitter to give an image of the space ahead of said missile at a television receiver station from which the missile can thus be telecontrolled in accordance with the indications given by this image.

The missile is designated by 1 and is essentially constituted by a streamlined body. This missile is steered by a rudder 2 and it carries a television transmitter the camera of which is shown at 3, its optical axis being X—X', the camera being pivotable with respect to body 1 about an axis parallel to the pivot axis of rudder 2.

It will be supposed that, at zero time, axis X—X' coincides with the axis of the missile, which passes through the target O, this target moving in a transverse direction indicated by arrow F.

At the observation station, the operator sees, on the television receiver screen, an image of the target which is located substantially at the center of this screen and is moving toward the periphery thereof. He therefore transmits to the missile, through tele-control means, the steering orders necessary to modfy the path of travel of the missile along a track C intended to bring the missile finally onto the target, this order producing a rotation $i_0$ of the rudder 2.

After a time interval of $\Delta t$, the relative position of the elements above referred to is that shown by Fig. 2. Target O has moved a slight distance in the direction of arrow F, but the axis of the missile has not yet changed because a certain delay is required by the missile to respond to the rotation of its rudder.

At the end of this delay (Fig. 3), the axis of the missile makes an incidence angle $i_0$ with the tangent T to its path of travel, this angle being that necessary for causing the missile to travel along path C, which is such that tangent T is passing through the target O.

It will be readily understood that if the television camera were rigidly fixed to the missile, the image of the target, in the position of Fig. 3, would seem to the operator to have moved toward the right which would induce him to actuate rudder 2 to steer the missile in this direction. This would be a mistake since, as above stated, in the position of Fig. 3 the missile is travelling as it should to strike the target.

Furthermore, when the control means of the missile, such as rudder 2, is moved as above supposed, there is not only a delay in the response of the missile to said rudder, but also an oscillation of the missile on either side of its new position with respect to its trajectory, which oscillation is quickly damped but nevertheless exists. Fig. 4 diagrammatically illustrates what takes place. Time is plotted in abscissas and the ordinates represent the angle of incidence of the missile on its trajectory (i. e. the angle made by its axis with tangent T). As above explained, there is some delay $d$ before this angle first reaches the value $i_0$ at which it will finally settle, but said angle overshoots the mark and then oscillates about value $i_0$ and it is only after a time interval $t_0$ that the oscillation is damped and the missile assumes a stable angular position with respect to its trajectory.

Of course, if the television camera 3 were fixed on missile 1 and no special means were provided as hereinafter described, the image at the receiver station would move according to this oscillation and this would induce the operator to transmit wrong steering corrections.

To avoid this, the steering control means of rudder 2 operate means for automatically displacing the image supplied by television camera 3 in response to the operation of said steering control means so that said image has rotated, at the end of time $t_0$, through an angle equal in magnitude but opposed in direction to the variation of the angle of incidence $i_0$. According to my invention, the rotation of the television image is caused to take place simultaneously, but in opposition, with the oscillation of this angle of incidence caused by an operation of rudder 2.

This result can be obtained in two different ways, to wit the means for moving the television image may be located: either on the missile, then consisting advantageously in mechanical means for pivoting television camera 3 with respect to the missile; or at the television receiving station, then consisting in optical or electronic means operatively connected with the telecontrol means.

I will describe an embodiment of my invention corresponding to the first case. For the sake of simplicity, I will describe only the means for controlling the movement in one plane (that perpendicular to the axis of rudder 2).

This embodiment is illustrated by Figs. 5 to 7.

It is supposed that missile 1 is of the self-steering type, i. e. is automatically directed, for instance through a radio finder device, toward a target. In other words, the missile is provided with target azimuth responsive steering means. For this purpose, the missile carries, pivotally mounted thereon about an axis 4, a finder device 3 electrically connected with a control system 36, itself arranged to operate a servo-mechanism 36 actuating the missile rudder 2 through a rod 5a. Such an arrangement is well known in the art.

When the direction of finder device 3 ceases to pass through the target, rudder 2 is pivoted through an angle j, tending to restore coincidence between the direction of finder device 3 and the direction of the target. But, as above explained, and as it is also known in the art, rudder 2 is connected to finder device 3 through a rod 5 and a lever 6 of a length such that said lever 6 is pivoted with respect to the missile in the same direction as rudder 2 and through an angle i which is equal in magnitude to the variation of the angle of incidence of missile 1 on its trajectory caused by said pivoting j of rudder 2 (at the end of the angular oscillation caused, as above explained, by said rudder displacement).

The journal 8 of lever 6 and the journal 4 of camera 3 are both pivoted in coaxial bearings of the missile frame. One end of journal 8 is fixed to the inner end of a spiral spring 7 the outer end of which is fixed to a pin 9 carried by a disc 10 of relatively high inertia rigid with journal 4.

Furthermore, a damping device 12 is interposed between pin 9 and an arm 11a rigid with a fixed part 11 carried by the missile frame.

If I call $A_0$, $A_1$ and $A_2$ respectively the moment of inertia of the missile, its damping characteristic and its characteristic of return into initial position (under the effect of rudder 2) and $a_0$, $a_1$ and $a_2$ respectively the moment of inertia of the mass which is actuated with respect to the missile (camera 3 and disc 10), the characteristic of damping device 12 and that of spring 7, the laws of pivoting movement of the missile and the camera will correspond to each other in the desired manner provided that values $a_0$, $a_1$ and $a_2$ are chosen so as to comply with the following condition:

$$\frac{A_0}{a_0} = \frac{A_1}{a_1} = \frac{A_2}{a_2}$$

Of course, when it is stated that the finder is pivoted, this means that either the whole finder or portions thereof (provided they include the pick-up elements thereof) are pivoted.

If values $A_0$, $A_1$, $A_2$ are not constant but vary, for instance as a function of the angle of incidence and of the angular speed of oscillation of the missile, the corresponding characteristics of the oscillating mechanism acting upon finder 3 must vary in the same way.

For this purpose, as shown by way of example by Figs. 8 and 9, I may make use of damping devices 12 the damping actions of which are practically proportional, in the case of Fig. 8, to the angular velocity, and, in the case of Fig. 9, to the square of this velocity, the damping characteristic being then practically constant in the case of Fig. 8 and practically proportional to the velocity in the case of Fig. 9.

These two damping devices, known in themselves, differ from each other by the number, the diameter and the length of the passages 13 provided in piston 14 for circulation of the damping liquid.

I will now consider the case where the correcting displacements imparted to the image are obtained through means located at a television receiving station, in which case the whole of the television camera 3a may be mounted in fixed position on the missile.

Figs. 10a and 10b show a first example. The missile 1 (Fig. 10a) carries a television camera 3a belonging to a television transmitter 33 which sends the video information through an antenna 33a.

This information is received by a television receiver 31 (Fig. 10b) including a viewing tube 16 (for instance a Braun tube) the screen of which shows what is visible from camera 3a. I interpose, at the television receiving station from which the missile is to be tele-controlled, between a mirror 15 giving a reflected image of the screen of tube 16 and a diaphragm 17 behind which the observer's eye is placed to see this reflected image, an oscillating mirror 18. This mirror 18 is rigid with a mass 10 of substantial inertia belonging to an oscillating system similar to that (7—8—9—10—11—12) above described with reference to Figs. 5, 6 and 7, the only difference being that lever 6, instead of being connected through a rod 5 to rudder 2, as in the case of Fig. 5, is connected through a rod 5b with the lever 26 by means of which the missile is to be steered from the control station. This lever 26 varies a resistance 25 inserted in the circuit of a radio transmitter 28. The control information thus transmitted is received by receiver 29 which operates rudder 2 through a servo-mechanism 30.

It will be readily understood that the result is practically the same as above explained.

However, it seems preferable to act through electric means to obtain the desired displacement of the image. In particular, the electronic beam in the receiver tube will be deviated in accordance with the operation of the telecontrol means. Figs. 11a and 11b show such an arrangement.

In this embodiment of my invention, the missile 1 carries, fixed at the front thereof, a television camera 3b and the video information is transmitted through transmitter 33 to a television receiver 31—32—16 at the telecontrol station. The cathode ray tube 16 of this receiver is provided, in addition to the usual beam deflecting means of a television viewing tube, with supplementary means for deflecting the electronic beam 20, for instance with plates 19 located on either side of this beam and these plates are inserted in an oscillating circuit 21, including for instance, in conventional fashion, a resistor 22, a self inductance coil 23 and a capacitor 24, the voltage fed to this circuit being controlled through a rheostat 25.

The movable arm 26 of this rheostat, which constitutes the control member at the station, is electrically connected with a radio transmitter which, through a radio receiver 29 and a servo-mechanism 30, transmits the steering orders given by said control lever 26 to rudder 2 on the missile.

Preferably, an amplifier 27 is interposed between the above mentioned circuit and tube 16.

The electric resistance R of resistor 22, the impedance L of coil 23 and the capacity C of capacitor 24 must be determined in such manner as to comply with the following condition:

$$\frac{A_0}{L} = \frac{A_1}{R} = A_2 C$$

This device will give the same results as those above described.

If values $A_0$, $A_1$ and $A_2$ are variable, then the elements of the oscillatory circuit (coils, resistors, capacitors, tubes) must be chosen to have correspondingly variable characteristics.

Of course, what has been described concerning the displacements of the missile in one plane applies to displacements in three dimensions. It would suffice, for instance, to provide means for correcting the displacements of the image in two different planes.

On the other hand, it is interesting to note that the time of response to the action of the control means and the law of damping of the oscillations due to this action vary in accordance with the Mach number and with the dynamic pressure of the flying vehicle.

It will therefore be advantageous, according to my invention, to vary the characteristics of the oscillatory devices of the system in response to the indications of a dynamic pressure measurement device and/or a Mach-meter so that these characteristics are modified in the same manner as the characteristics of the missile or other vehicle when the dynamic pressure and/or the Mach number varies.

In the case of an arrangement as illustrated by Figs. 11a and 11b, the operator can vary manually the resistance R of resistor 22, the impedance L of coil 23 and the capacity C of capacitor 24 in accordance with the values of the Mach number and the dynamic pressure of flight of missile 1, these values being read on the dials of a radio receiver 34 which receives this information from a radio receiver 35 controlled by a Mach-meter 36 and a dynamic pressure measuring device 37 mounted on said missile 1.

Finally, it should be noted that I have indicated merely by way of example the above described trajectory intended to lead a missile onto a target, according to which the velocity vector T (tangent to the trajectory of the center of gravity of the missile) is caused to pass constantly through the target. My invention also applies to vehicles, such as aircraft, intended to follow other kinds of trajectories for which the axis of the finder device to be stabilized with respect to a reference system fixed in space.

In this case, upon every variation of the angle of incidence, after having imparted to the axis of the finder device a correcting displacement equal in magnitude and opposed in direction to said incidence angle variation, means are provided for further effecting a correction which rotates the image in the opposite direction and with the same magnitude as the velocity vector T of the vehicle has been rotating with respect to the fixed reference system.

Of course, electric oscillation eliminating means of the kind shown by Figs. 11a and 11b may be applied to a self steering missile such as shown by Fig. 5, the mechanical oscillating device 7—8—9—10—11—12 being replaced by the electrical system 22—23—24.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. For use in connection with a steerable aircraft provided with a target finder device, the combination of steering means on said aircraft, means operative by said finder device for controlling said steering means, means operative by said control means for compensating the effect on said finder device of the oscillatory angular displacement of said aircraft with respect to the tangent to the trajectory of its center of gravity due to said control means operation, said compensating means including, for transmission of the action of said control means, a damped oscillatory system having oscillatory parameters proportional to the aerodynamic oscillatory parameters of said aircraft, so as to at least substantially reduce the oscillatory effects on said finder device of the oscillatory angular displacements of the aircraft with respect to said tangent consecutive to the operation of said steering means.

2. For use in connection with a steerable aircraft provided with a finder device for giving an image of space as visible from said aircraft, this finder device including an image transmitter mounted on said aircraft and a corresponding image receiver located at a distance from said aircraft at a telecontrol station, the combination of steering means on said aircraft, telecontrol means for operating said steering means from said telecontrol station, means operative by said control means for compensating the effect on said image at the receiver of the oscillatory angular displacement of said aircraft with respect to the tangent to the trajectory of its center of gravity which is due to said control means operation, said compensating means including, for transmission of the action of said control means, a damped oscillatory system having oscillatory parameters proportional to the aerodynamic oscillatory parameters of said aircraft, so as to at least substantially reduce the oscillatory effects on said image of the oscillatory angular displacements of the aircraft with respect to said tangent consecutive to the operation of said steering means.

3. For use in connection with a steerable aircraft provided with a finder device for giving an image of space as visible from said aircraft, this finder device including an image transmitter mounted on said aircraft and a corresponding image receiver located at a distance from said aircraft at a telecontrol station, the combination of steering means on said aircraft, telecontrol means for operating said steering means from said telecontrol station, an image pick-up device belonging to said transmitter pivotally mounted on said aircraft, compensating means interposed between said steering means and said pick-up device for giving said pick-up device, in response to an operation of said steering means, a pivoting displacement with respect to said aircraft equal in amplitude and opposed in direction to the angular displacement of said aircraft with respect to the tangent to the trajectory of its center of gravity which is due to said operation of said steering means, said compensating means including a damped-oscillatory system having oscillatory parameters proportional to the aerodynamic oscillatory parameters of said aircraft, so as to at least substantially reduce the oscillatory displacements of the image sent by said transmitter which are due to the oscillatory angular displacements of the aircraft with respect to said tangent consecutive to the operation of said steering means.

4. For use in connection with a steerable aircraft provided with a television device for giving a visual image of space as visible from said aircraft, this television device including a transmitter mounted on said aircraft and a corresponding receiver located at a distance from said aircraft at a telecontrol station, the combination of a steering rudder on said aircraft, telecontrol means for operating said steering rudder from said telecontrol station, a camera belonging to said television transmitter pivotally mounted on said aircraft about an axis parallel to the pivot axis of said camera, compensating means interposed between said rudder and said camera for giving said camera in response to a pivoting displacement of said rudder, a similar pivoting displacement with respect to said aircraft, said compensating means including a damped oscillatory system having oscillatory parameters proportional to the aerodynamic oscillatory parameters of said aircraft, so as to at least substantially reduce the oscillatory displacements of the image sent by said transmitter which are due to the oscillatory angular displacements of the aircraft with respect to said tangent consecutive to the operation of said steering means.

5. For use in connection with a steerable aircraft provided with a finder device for giving an image of space as visible from said aircraft, this finder device including an image transmitter mounted on said aircraft and a corresponding image receiver located at a distance from said aircraft at a telecontrol station, the combination of steering means on said aircraft, telecontrol means for operating said steering means from said telecontrol station including a control member at said station, optical means at said station operative by said control member for displacing the image formed at said receiver to compensate the effect on said image of the angular displacement of said aircraft with respect to the tangent to the trajectory of its center of gravity which is due to said control means operation, and a damped oscillatory system interposed between said control member and said optical means, said system having oscillatory parameters proportional to the aerodynamic oscillatory parameters of said aircraft, so as to at least substantially reduce the oscillatory displacements of the image sent by said transmitter which are due to the oscillatory angular displacements of the aircraft with respect to said tangent consecutive to the operation of said steering means.

6. For use in connection with a steerable aircraft provided with a finder device for giving an image of space as visible from said aircraft, this finder device including an image transmitter mounted on said aircraft and a corresponding image receiver located at a distance from said aircraft at a telecontrol station, the combination of steering means on said aircraft, telecontrol means for operating said steering means from said telecontrol station including a control member at said station, electronic means at said station operative by said control member for displacing the image formed at said receiver to compensate the effect on said image of the oscillatory angular displacement of said aircraft with respect to the tangent to the trajectory of its center of gravity which is due to said control means operation, and a damped oscillatory electric system interposed between said control member and said electronic means, said system having oscillatory parameters proportional to the aerodynamic oscillatory parameters of said aircraft, so as to at least substantially reduce the oscillatory displacements of the image sent by said transmitter which are due to the oscillatory angular displacements of the aircraft with respect to said tangent consecutive to the operation of said steering means.

References Cited in the file of this patent

UNITED STATES PATENTS

| | | |
|---|---|---|
| 2,100,934 | Berges | Nov. 30, 1937 |
| 2,420,016 | Sanders | May 6, 1947 |
| 2,480,868 | Marshall | Sept. 6, 1949 |
| 2,496,391 | Hall | Feb. 7, 1950 |
| 2,515,254 | Nosker | July 18, 1950 |
| 2,557,401 | Agins et al. | June 19, 1951 |
| 2,715,364 | Buck | Aug. 16, 1955 |

OTHER REFERENCES

"Flying Torpedo with an Electric Eye," V. K. Zworykin, RCA Review, September 1946, vol. III, No. 3, pp. 293–302.

TV-Guided War Missile," Television, January 1950, page 59. (Copy in 178–6.8, Division 16.)